Patented June 21, 1927.

1,633,500

UNITED STATES PATENT OFFICE.

ENRICO SERCHI, OF SIENA, ITALY, ASSIGNOR TO ISIDORE BRAGGIOTTI, OF BROOKLINE, MASSACHUSETTS.

PUNCTURE-SEALING COMPOSITION FOR PNEUMATIC TIRES.

No Drawing. Application filed April 16, 1924, Serial No. 706,996, and in Italy May 2, 1923.

Automobilists, bicycle riders, and others who use pneumatic tires, are only too familiar with the annoyance caused by punctures. Such punctures may occur due to a tire running on a tack, nail, piece of glass, or the like, and they frequently are so small that it is difficult to find them, but nevertheless permit the escape of air at such a rate as to interfere seriously with the use of the tire or even to render such use impossible.

The present invention has for its chief object to eliminate this trouble. The invention aims especially to devise a composition which, when used in a pneumatic tire, tube, or similar device, will automatically seal a puncture so that the use of the tire will not be impaired or interrupted by the puncture.

I have discovered that a composition which serves this purpose very satisfactorily can be made by dissolving glycerine and a suitable adhesive in water, and adding to this solution a pulverized inert mineral substance, such as talc, the proportions being such as to give the entire mixture a viscous consistency at normal temperatures. It is preferable, also, to add a dye or coloring material of some character which may be present in only a very minute quantity. A composition which I have found especially satisfactory, consists of the following ingredients:

Silicate of magnesia (talcum powder)— $Mg_2SiO_4$, 20 grams; bidistillate of glycerine—$C_3H_8O_3$, 10 grams; dextrine (starch glue—$C_6H_{10}O_5$, 15 grams; methol blue—$C_{37}H_{26}N_3S_3O_9Na_3$, .00025 grams; water—$H_2O$, 45 grams.

It is preferable in mixing these ingredients together to dissolve the dextrine in the water at about 60° F. and then add the glycerine. This mixture should be kept quiet for about ten minutes and then shaken violently with an electric shaker, or any other suitable implement, for about two minutes. The talcum powder and the dye or coloring material can then be added, and the whole shaken or stirred until it has a homogeneous consistency.

The weights given in the above formula make a quantity sufficient for one bicycle tire. Obviously, a larger quantity is required in an automobile tire. This mixture at normal temperature is viscous, but still flows with sufficient freedom to permit its introduction into the tire through the ordinary air valve, the introduction preferably being effected by means of a tire pump. The composition remains in a liquid condition even after a long period of use, and if the tire should be punctured the liquid immediately flows into the puncture and seals it, thus preventing the escape of air and maintaining the tire in an operative condition notwithstanding the puncture.

While the formula above given has been found very satisfactory, it will readily be appreciated that the exact proportions stated are not absolutely essential, but that reasonable variations in these proportions may be made while still producing a satisfactory composition. Furthermore, certain equivalents may be substituted for some of the ingredients, particularly for the talcum powder and dextrine, as will be evident to any competent chemist.

This composition can also be used to advantage in repairing a pneumatic tube after it has been punctured.

Having thus described my invention, what I desire to claim as new is:

1. A composition for sealing punctures in pneumatic tires and the like, comprising a water solution of glycerine and a starchy adhesive with a substantial percentage of an inert pulverized mineral substance suspended in said solution, said ingredients being in such proportions as to form a viscous liquid at normal temperatures.

2. A composition for sealing punctures in pneumatic tires and the like having approximately the following composition:

| | Parts by weight. |
|---|---|
| Talcum powder | 20 |
| Glycerine | 10 |
| Dextrine | 15 |
| Water | 45 |

3. A composition for sealing punctures in pneumatic tires and the like having approximately the following composition:

| | Parts by weight. |
|---|---|
| Talcum powder | 20 |
| Glycerine | 10 |
| Dextrine | 15 |
| Water | 45 |
| Coloring | .00025 |

In testimony whereof I have hereunto signed my name to this specification.

ENRICO SERCHI. [L. S.]